United States Patent
Suzuki et al.

[19]

[11] Patent Number: 6,006,532
[45] Date of Patent: Dec. 28, 1999

[54] REFRIGERANT CYCLE SYSTEM

[75] Inventors: Takahisa Suzuki, Kariya; Katsuya Ishii; Kunio Iritani, both of Anjo; Satoshi Itoh, Kariya, all of Japan

[73] Assignee: Denso Corporation, Kariya, Japan

[21] Appl. No.: 09/112,884

[22] Filed: Jul. 9, 1998

[30] Foreign Application Priority Data

Jul. 10, 1997 [JP] Japan ................................. 9-185497

[51] Int. Cl.⁶ ............................. F25B 43/02; F25B 39/04
[52] U.S. Cl. ................... 62/225; 62/473; 62/509
[58] Field of Search .................. 62/509, 473, 225

[56] References Cited

U.S. PATENT DOCUMENTS 4,517,811  5/1985  Atsumi et al. ............................ 62/509

FOREIGN PATENT DOCUMENTS 031 4857  12/1989  Japan ....................................... 62/509
3-260556  11/1991  Japan .

*Primary Examiner*—William Wayner
*Attorney, Agent, or Firm*—Harness, Dickey & Pierce, PLC

[57] ABSTRACT

In a refrigerant cycle system, a gas-liquid separator has a gas-suction pipe for introducing gas refrigerant from the gas-liquid separator to a compressor. The gas-suction pipe has an open end opened in a gas-refrigerant area in the gas-liquid separator, a first suction hole, provided in a liquid-refrigerant area of the gas-liquid separator, for sucking liquid refrigerant containing lubricating oil, and a second suction hole provided in the gas-refrigerant area of the gas-liquid separator. The second suction hole for sucking gas refrigerant is formed in the gas-suction pipe at a downstream refrigerant side of the first suction hole. Therefore, a flow rate of gas refrigerant passing through around the first suction hole in the gas-suction pipe is decreased due to introduction of gas refrigerant by the second suction hole, thereby decreasing quantity of liquid refrigerant sucked from the first suction hole. Thus, liquid refrigerant is prevented from excessively returning to the compressor, even if the first suction hole is enlarged.

11 Claims, 3 Drawing Sheets

REFRIGERANT CYCLE SYSTEM

CROSS-REFERENCE TO RELATED APPLICATION

This application relates to and claims priority from Japanese Patent Application No. Hei. 9-185497 filed on Jul. 10, 1997, the contents of which are hereby incorporated by reference.

BACKGROUND OF THE INVENTION

1. Field of the Invention

The present invention relates to a refrigerant cycle system having a gas-injection structure for injecting gas refrigerant from a gas-liquid separator to a compressor. The refrigerant cycle is suitable for an air conditioning apparatus for a vehicle such as a hybrid vehicle and an electrical vehicle.

2. Description of Related Art

As shown in FIG. 4, a conventional refrigerant cycle includes a compressor 122 having an outlet port 122a, an inlet port 122b and a gas-injection port 122c. The compressor 122 is a scroll type in which the gas-injection port 122c introduces middle-pressure gas refrigerant into the compressor 122 while the compressor 122 compresses refrigerant, for example.

When an air conditioning apparatus for a vehicle is in a heating mode, high-pressure high-temperature gas refrigerant compressed by the compressor 122 is introduced into a first heat exchanger 121 disposed in an air duct 102 provided inside a passenger compartment of the vehicle. The first heat exchanger 121 performs heat-exchange between air blown by a blower 106 and the high-pressure high-temperature gas refrigerant flowing through the first heat exchanger 121. Thus, during the heating mode, the refrigerant is condensed and liquefied in the first heat exchanger 121, and air is heated by absorbing heat from the refrigerant to be warm air.

The liquid refrigerant condensed by the first heat exchanger 121 is decompressed (press-reduced) in a high-pressure side expansion valve 126 (i.e., first decompressing means) until it becomes in middle-pressure gas-liquid refrigerant. The middle-pressure gas-liquid refrigerant is introduced into a gas-liquid separator 127 to be separated into gas refrigerant and liquid refrigerant. The gas refrigerant from the gas-liquid separator 127 flows through a gas-injection passage 129, and is introduced into an compression-intermediate portion of the compressor 122 through the gas-injection port 122c.

The liquid refrigerant from the gas-liquid separator 127 is decompressed by a low-pressure side expansion valve 128 (i.e., second decompressing means) until a predetermined low pressure to be gas-liquid two-phase refrigerant. The gas-liquid two-phase refrigerant from the expansion valve 128 is evaporated in a second heat exchanger 124 disposed outside the passenger compartment, by absorbing heat from outside air (i.e., air outside the passenger compartment). This gas refrigerant from the second heat exchanger 124 is introduced into the compressor 122 through the inlet port 122b. The expansion valve 128 is a thermal expansion valve, which detects a super-heating degree of the refrigerant to be sucked into the inlet port 122b of the compressor 122 and controls a flow rate of the refrigerant flowing into the second heat exchanger 124 according to the detected super-heating degree. Thus, the expansion valve 128 prevents liquid refrigerant which cannot be evaporated in the second heat exchanger 124 from being introduced into the inlet port 122b of the compressor 122. In the above-described refrigerant cycle with the gas-injection function, heating capacity of the air-conditioning apparatus is improved as compared with that of an air conditioning apparatus having a refrigerant cycle without the gas-injection function.

Lubricating oil is used for the compressor 122 so that a sliding portion of the compressor 122 moves smoothly. The lubricating oil is dissolved in liquid refrigerant and circulates through the refrigerant cycle along with liquid refrigerant. In the gas refrigerant area of the refrigerant cycle, the lubricating oil circulates through the refrigerant cycle while being washed away by gas refrigerant along an inner wall of a refrigerant pipe. That is, the lubricating oil dissolved in liquid refrigerant in the gas-liquid separator 127 passes through the low-pressure side expansion valve 128 and flows into the second heat exchanger 124 along with the refrigerant flow. The lubricating oil from the second heat exchanger 124 is returned to the compressor 122.

However, when the air conditioning apparatus is used at an extraordinary low temperature such as $-20°$ C., the evaporating temperature of refrigerant becomes lower $-30°$ C. in the second heat exchanger 124 due to decrease of the opening degree of the low-pressure side expansion valve 128. As a result, viscosity of the lubricating oil may become extremely high, resulting in adhesion of the lubricating oil to the inner wall of the refrigerant pipe. Therefore, the lubricating oil can not flow by the gas-refrigerant flow. That is, at an extremely low temperature as described above, the lubricating oil hardly flows from the second heat exchanger 124 to the compressor 22; and therefore, durability of the compressor 122 is decreased. Especially, when the compressor 122 is a scroll-type, abrasion of a sliding surface in the vicinity of the outlet port 122a of the compressor 122 may cause a big problem.

JP-A-3-260556 discloses a refrigerant cycle with a gas-injection function, which introduces not only gas refrigerant in a gas-liquid separator but also liquid refrigerant in the gas-liquid separator into a compressor through a gas-injection passage. In the refrigerant cycle, the gas-liquid separator is provided with a gas-suction pipe connected to the gas-injection passage of the compressor. In the gas-liquid separator, the gas-suction pipe is immersed in a liquid-refrigerant area, while an opening end of the gas-suction pipe is positioned in a gas-refrigerant area. Further, the immersed part of the gas-suction pipe has a suction hole for sucking the liquid refrigerant. Therefore, both gas and liquid refrigerant in the gas-liquid separator can be introduced into the compressor 22 through the gas-injection passage.

In the above-mentioned refrigerant cycle, liquid refrigerant is sucked into the gas-suction pipe through the suction hole by suction power of gas refrigerant flowing through the gas-suction pipe. Therefore, quantity of liquid refrigerant returning to a compressor through the gas-injection passage is determined according to a flow rate of gas refrigerant flowing through the gas-suction pipe and an opening area of the suction hole. However, the suction hole having a small diameter may be blocked due to dirt and dust contained in the refrigerant, and it is difficult to suck liquid refrigerant to be returned to the compressor during a long period. On the other hand, if the suction hole is made larger, too much liquid refrigerant returns to the compressor through the gas-injection passage, resulting in deterioration of efficiency of the refrigerant cycle. Further, in this case, the operation of the compressor may be affected due to compression of liquid refrigerant by the compressor.

SUMMARY OF THE INVENTION

In view of the foregoing problems, it is an object of the present invention to provide a refrigerant cycle system in which a gas-liquid separator includes a gas-suction pipe having a suction hole through which liquid refrigerant to be introduced into the compressor is sucked to prevent the suction hole from being blocked by dirt and dust contained in refrigerant and to prevent liquid refrigerant from returning to the compressor excessively.

According to the present invention, a refrigerant cycle system includes a gas-liquid separator for separating refrigerant into gas refrigerant and liquid refrigerant, and the gas-liquid separator has a gas-suction pipe for introducing gas refrigerant from the gas-liquid separator to a compressor through a gas-injection pipe. The gas-suction pipe has an open end opened in gas refrigerant in the gas-liquid separator, a middle portion which is immersed in liquid refrigerant in the gas-liquid separator and has a first suction hole through which liquid refrigerant introduced, and a second suction hole at a downstream refrigerant side of the first suction hole, provided in gas refrigerant of the gas-liquid separator. Thus, liquid refrigerant containing lubricating oil for lubricating the compressor is introduced into the gas-suction pipe through the first suction hole, and can be further introduced into the compressor. Accordingly, the compressor is supplied with lubricating oil sufficiently even at an extremely low temperature of outside air. Further, because the gas-suction pipe has the second suction hole provided in gas refrigerant of the gas-liquid separator at a downstream refrigerant side of the first suction hole, a flow rate of the gas refrigerant passing around the first suction hole can be decreased. Therefore, quantity of liquid refrigerant sucked from the first suction hole is decreased, and the first suction hole can be made larger. Thus, liquid refrigerant is prevented from returning excessively to the compressor, even when the first suction hole is enlarged so that the first suction hole is not blocked by dirt and dust contained in refrigerant.

Preferably, the first suction hole has an opening area less than each opening area of the second suction hole and the open end of the gas-suction pipe. Therefore, the quantity of liquid refrigerant sucked from the first suction hole can be readily adjusted.

More preferably, the gas-suction pipe is approximately a U-shaped pipe having first and second ends and a bottom, the open end of the gas-suction pipe is formed at the first end of the U-shaped pipe, the second end of the U-shaped pipe is connected to the gas-injection pipe, and the first suction hole is formed in the bottom of the U-shaped pipe. Therefore, the gas suction pipe is readily formed in the gas-liquid separator.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention are described hereinafter with reference to the accompanying drawings.

Figure 1:
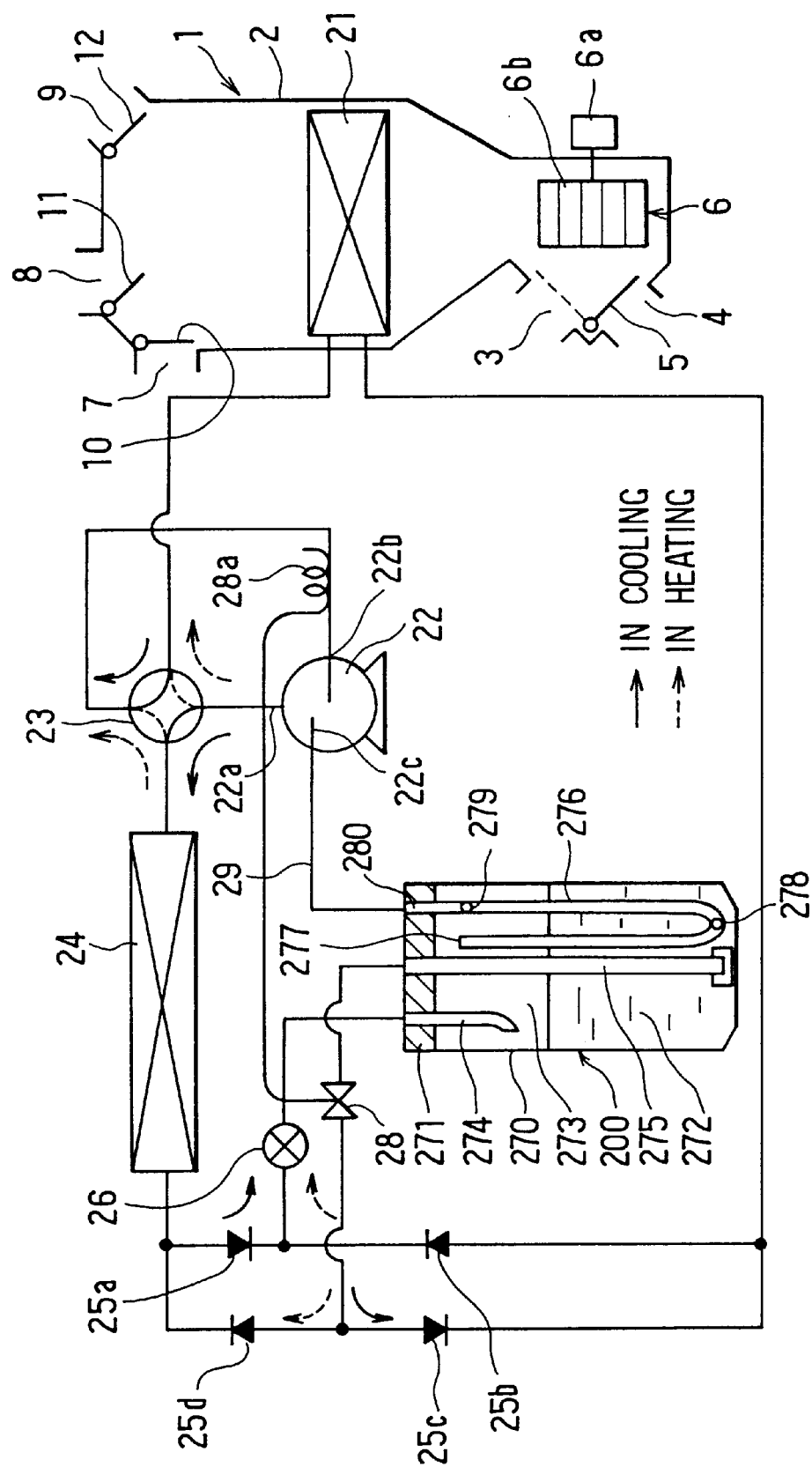
FIG. 1 is a schematic diagram showing a ventilation system and a refrigerant cycle of an air conditioning apparatus for a vehicle according to a first preferred embodiment of the present invention.
Figure 2:
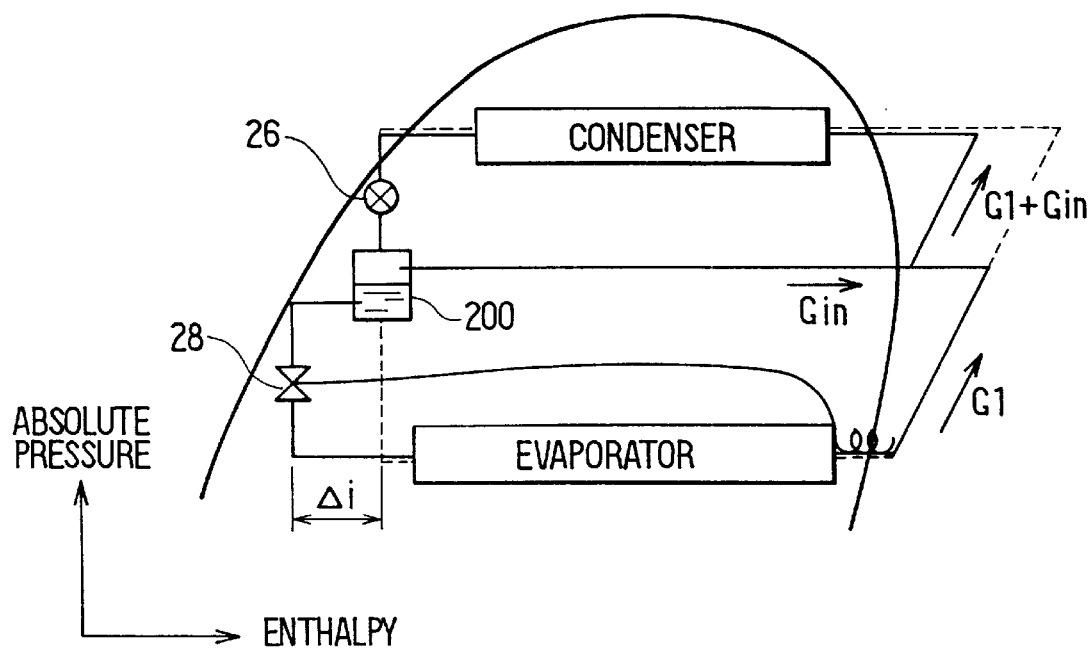
FIG. 2 is a Mollier chart of the refrigerant cycle according to the first embodiment.

A first preferred embodiment of the present invention will be now described with reference to FIGS. 1 and 2. A ventilation system 1 of an air conditioning apparatus is generally disposed under an instrument panel in a passenger compartment of a vehicle such as a hybrid vehicle (HV) and an electrical vehicle (EV). As shown in FIG. 1, the ventilation system 1 has an air duct 2 which forms an air passage for leading air toward a passenger compartment of the vehicle. An inside air inlet 3 for introducing therein inside air (i.e., air inside the passenger compartment) and an outside air inlet 4 for introducing therein outside air (i.e., air outside the passenger compartment) are provided at one end side of the air duct 2. The air inlets 3, 4 are opened and closed by an inside/outside air switching door 5.

A blower 6 for blowing air introduced from the air inlets 3, 4 into the air duct 2 is disposed adjacent to the inside and outside air inlets 3, 4. The blower 6 has a motor 6a and a centrifugal fan 6b activated by the motor 6a. At the other end side of the air duct 2, air outlets 7, 8, 9 communicating with the passenger compartment are provided. The air outlets 7, 8, 9 are opened and closed by mode switching doors 10, 11, 12, respectively.

A first heat exchanger 21 (i.e., interior heat exchanger) of the refrigerant cycle is disposed in the air duct 2 at a downstream air side of the blower 6. When the air conditioning apparatus is in heating mode, the first heat exchanger 21 operates as a condenser which condenses refrigerant discharged from a compressor 22 so that air flowing through the air duct 2 is heated by latent heat of the condensation. When the air conditioning apparatus is in cooling mode, the first heat exchanger 21 operates as an evaporator in which low pressure refrigerant absorbs heat from air to cool air in the air duct 2.

The compressor 22 is a scroll-type compressor, for example, and has an outlet port 22a, an inlet port 22b and a gas-injection port 22c. Through the gas-injection port 22c, gas refrigerant from a gas-liquid separator 200 is introduced into the compressor 22 at a compression-intermediate state (i.e., compression-intermediate step of the compressor).

The refrigerant cycle has a four-way valve 23 for switching flow directions of refrigerant. In FIG. 1, a solid-line arrow indicates a flow direction of refrigerant during the cooling mode, and a broken-line arrow indicates a flow direction of refrigerant during the heating mode. A second heat exchanger 24 is disposed outside the passenger compartment and performs heat-exchange between outside air blown by an outside fan (not shown) and refrigerant flowing through the second heat exchanger 24. In the first embodiment of the present invention, the second heat exchanger 24 operates as an evaporator during the heating mode, and operates as a condenser during the cooling mode.

Check valves 25a, 25d are connected to one end of the second heat exchanger 24 in parallel in such a manner that opening directions thereof are opposite from each other. Check valves 25b, 25c are connected to one end of the first heat exchanger 21 in parallel in such a manner that opening directions thereof are opposite from each other. A high-pressure side expansion valve 26, the gas-liquid separator 200 and a low-pressure side expansion valve 28 are connected in series between the outlet ports of the check valves 25a, 25b, and the inlet ports of the check valves 25c, 25d.

The high-pressure side expansion valve 26 is an electrical expansion valve operating as first decompressing means for decompressing high-pressure refrigerant to middle-pressure refrigerant. That is, an opening degree of the high-pressure side expansion valve 26 is controlled so that refrigerant has a target middle-pressure. The gas-liquid separator 200 separates middle-pressure gas-liquid two-phase refrigerant into gas refrigerant and liquid refrigerant, and stores liquid refrigerant therein.

The low-pressure side expansion valve 28 operates as second decompressing means for decompressing the middle-pressure liquid refrigerant separated by the gas-liquid separator 200 to low-pressure refrigerant. The low-pressure side expansion valve 28 is a thermal expansion valve having a temperature sensor 28a which detects temperature of gas refrigerant to be introduced into the inlet port 22b of the compressor 22. An opening degree of the low-pressure side expansion valve 28 is controlled so that a super-heating degree of the gas refrigerant to be introduced into the compressor 22 is set to a preset value.

Next, a structure of the gas-liquid separator 200 which is a main point of the present invention will be now described. The gas-liquid separator 200 has a container 270 made of metal and formed into an elongated substantial cylinder, and a cap portion 271 for closing the upper opened end of the container 270. A liquid refrigerant area 272 is formed in the lower part of the container 270, and a gas refrigerant area 273 is formed in the upper part of the container 270.

An inlet pipe 274, an outlet pipe 275 and a gas-suction pipe 276 are attached to the cap portion 271. The inlet pipe 274 introduces gas-liquid two-phase refrigerant, decompressed to middle-pressure refrigerant by the high-pressure side expansion valve 26, into the gas-liquid separator 200. The open end of the inlet pipe 274 is opened in the gas-refrigerant area 273 to face an inside wall of the container 270. Through the outlet pipe 275, liquid refrigerant is supplied from the gas-liquid separator 200. The open end of the outlet pipe 275 is opened in the lowest position of the liquid-refrigerant area 272, in the vicinity of the bottom of the gas-liquid separator 200. The gas-suction pipe 276 is for introducing gas refrigerant from the gas-liquid separator 200 to a gas-injection passage 29 connected to the gas-injection port 22c of the compressor 22. The gas-suction pipe 276 is formed approximately in a U-shape and has an open end 277 at one end of the U-shaped pipe. The open end 277 of the gas-suction pipe 276 is positioned in the gas-refrigerant area 273, and gas refrigerant is introduced from the gas-liquid separator 200 to the compressor 22 through the opened end 277 of the gas-suction pipe 276. The middle part (i.e., lower part) of the U-shaped gas-suction pipe 276 is immersed in the liquid-refrigerant area 272, and has a first suction hole 278, provided at the lowest part of the U-shaped gas-suction pipe 276, for sucking liquid refrigerant. Further, the gas-suction pipe 276 has a second inlet hole 279, provided in the gas-refrigerant area 273 at a downstream refrigerant side of the first inlet hole 278, for sucking gas refrigerant. The other end 280 of the U-shaped gas-suction pipe 276 is held in the cap portion 271 and communicates with the gas-injection passage 29.

Because the first inlet hole 278 is used for sufficiently returning lubricating oil to the compressor 22 even when the temperature of outside air becomes lower, an opening area of the first inlet hole 278 is set to be smaller than either that of the second inlet hole 279 or that of the open end 277 to prevent liquid refrigerant from returning to the compressor 22 excessively. In the first embodiment of the present embodiment, the opening area of the first inlet hole 278 is set to be substantially equal to an area of a circle having a diameter of 1.0 mm, the opening area of the open end 277 is set to be substantially equal to an area of a circle having a diameter of 6.0 mm, and the opening area of the second suction hole 279 is set to be substantially equal to an area of a circle having a diameter of 7.0 mm. Therefore, the opening area of the second suction hole 279 is larger than that of the open end 277, and the opening area of the open end 277 is larger than that of the first suction hole 278.

The gas-suction pipe 276 is generally formed in a round cross-section. Since the opening area of the first suction hole 278 is sufficiently small as compared with a cross-section area of the gas-suction pipe 276, the first suction hole 278 can be formed into a circle. On the other hand, it is difficult to form the second inlet hole 279 into a circle on the gas-suction pipe 276, because the opening area of the second inlet hole 279 is large. In this case, the second inlet hole 279 can be formed into a plurality of circles or can be formed into a single oblong to have the opening area larger than that of the first inlet hole 297.

Next, an operation of the above-described refrigerant cycle of the air conditioning apparatus will be described. Referring to FIG. 1, during the heating mode, high-pressure high-temperature gas refrigerant discharged from the compressor 22 flows into the first heat exchanger 21 disposed in the passenger compartment through the four-way valve 23 as indicated by the broken-line arrow. In the first heat exchanger 21, the gas refrigerant is heat-exchanged with air blown by the blower 6. Therefore, the gas refrigerant is condensed to be high-pressure liquid refrigerant, and the air blown by the blower 6 is heated and is blown toward the passenger compartment.

The high-pressure liquid refrigerant from the first heat exchanger 21 flows into the high-pressure side expansion valve 26 via the check valve 25b, is decompressed to middle-pressure gas-liquid two-phase refrigerant by the high-pressure side expansion valve 26, and flows into the gas-liquid separator 200 from the inlet pipe 274. In the gas-liquid separator 200, the gas-liquid tow-phase refrigerant is separated into gas refrigerant and liquid refrigerant. The liquid refrigerant is stored in the lower part of the gas-liquid separator 200, and forms the liquid-refrigerant area 272. The liquid refrigerant sucked from the outlet pipe 275 of the gas-liquid separator 200 is supplied to the low-pressure side expansion valve 28, and is decompressed to low-pressure gas-liquid two-phase refrigerant by the low-pressure side expansion valve 28.

The low-pressure gas-liquid two-phase refrigerant from the low-pressure side expansion valve 28 flows into the second heat exchanger 24 through the check valve 25d to perform heat-exchange with outside air. In the second heat exchanger 24, liquid refrigerant is evaporated to become in gas refrigerant, and the gas refrigerant is introduced into the compressor 22 through the inlet port 22b, via the four-way valve 23.

On the other hand, gas refrigerant in the gas-refrigerant area 273 formed in the upper part of the gas-liquid separator 200 is sucked into the gas-suction pipe 276 from both of the open end 277 and the second suction hole 279, and flows into the gas-injection passage 29. At the same time, a little amount of liquid refrigerant is also sucked into the gas-suction pipe 276 from the first suction hole 278.

The gas refrigerant from the gas-liquid separator 200 flows through the gas-injection passage 29 and is introduced into the compressor 22 from the gas-injection port 22c while the compressor 22 undertakes compression. As shown in FIG. 2, because middle-pressure gas refrigerant (Gin) is introduced from the gas-liquid separator 200 into a compression-intermediate state of the compressor 22, enthalpy of the second heat exchanger 24 (condenser) is increased by $\Delta i$ while quantity of heat absorbed by refrigerant in the second heat exchanger 24 is increased, and quantity of circulating refrigerant is increased to G1+Gin. This improves heating performance of the air conditioning apparatus.

When outside air temperature is extremely low (e.g., −20° C.), evaporating temperature of refrigerant becomes less than −30° C., and the viscosity of the lubricating oil may be drastically increased in the second heat exchanger 24. Therefore, the lubricating oil tends to adhere to the inside wall of an outlet pipe of the second heat exchanger 24, resulting in shortage of the lubricating oil returning to the compressor 22.

According to the first embodiment of the present embodiment, liquid refrigerant containing the lubricating oil can be sucked into the gas-suction pipe 276 through the first suction hole 278, and can be introduced into the compressor 22 through the gas-injection port 22c, together with gas refrigerant. Therefore, the compressor 22 can be sufficiently provided with the lubricating oil and operate smoothly even in an extremely cold environment.

Further, in the first embodiment of the present invention, the gas-suction pipe 276 has not only the first suction hole 278 for sucking liquid refrigerant but also the second suction hole 279 for sucking gas refrigerant. Generally, the opening area of the first suction hole 278 is set to be equal to an area of a circle having a diameter of 0.5 mm to prevent liquid refrigerant from returning to the compressor 22 excessively. However, in the first embodiment, the second suction hole 279 for sucking gas refrigerant is additionally formed on the gas-suction pipe 276 at the downstream refrigerant side of the first suction hole 278. Therefore, the flow rate of the gas refrigerant passing through around the first suction hole 278 in the gas-suction pipe 276 can be decreased due to introduction of the gas refrigerant from the second suction hole 279, resulting in decrease of quantity of the liquid refrigerant introduced from the first suction hole 278. Thus, owing to the second suction hole 279, the opening area of the first suction hole 278 can be enlarged. That is, in the first embodiment, the opening area of the first suction hole 278 can be increased to an area of a circle having a diameter of 1.0 mm. As a result, the first suction hole 278 can be prevented from being blocked by dirt and dust contained in liquid refrigerant, while the compressor 22 is provided with an appropriate amount of the lubricating oil and operates smoothly in a long period.

On the other hand, during the cooling mode, high-pressure high-temperature gas refrigerant discharged from the compressor 22 is introduced into the second heat exchanger 24 disposed outside the passenger compartment via the four-way valve 23 to be cooled and condensed, as indicated by the solid-line arrow in FIG. 1. High-pressure liquid refrigerant discharged from the second heat exchanger 24 is introduced into the high-pressure side expansion valve 26 through the check valve 25a to be decompressed to middle-pressure gas-liquid two-phase refrigerant, and then introduced into the gas-liquid separator 200. Liquid refrigerant being separated from the gas-liquid two-phase refrigerant by the gas-liquid separator 200 is introduced to the low-pressure side expansion valve 28 to be decompressed, and then flows into the first heat exchanger 21 via the check valve 25c.

In the first heat exchanger 21, refrigerant absorbs heat from air blown by the blower 6 to cool air blown toward the passenger compartment. The evaporated gas refrigerant is sucked into the compressor 22 from the inlet port 22b through the four-way valve 23. On the other hand, the gas refrigerant in the gas-liquid separator 200 is sucked into the gas-suction pipe 276 through both of the open end 277 and the second suction hole 279, and is introduced into the gas-injection passage 29, while a little amount of liquid refrigerant is also sucked and is introduced into the gas-injection passage 29. The gas refrigerant flows through the gas-injection passage 29 and is introduced into the compressor 22 from the gas-injection port 22c.

During the cooling mode, gas refrigerant and liquid refrigerant is sucked and is introduced from the gas-liquid separator 200 to the compressor 22 by the gas-suction pipe 276, similarly to the operation in the heating mode. However, viscosity of the lubricating oil to be introduced into the compressor 22 tends to be lower than that in the heating mode because evaporating temperature of refrigerant in the first heat exchanger 21 is generally higher than 0° C. Therefore, during the cooling mode, quantity of the lubricating oil returning to the inlet port 22b of the compressor 22 from the first heat exchanger 21 is relatively large. Thus, in the cooling mode, the compressor 22 is originally not likely to be short of the lubricating oil.

A second preferred embodiment of the present invention will be now described with reference to FIG. 3.

Figure 3:
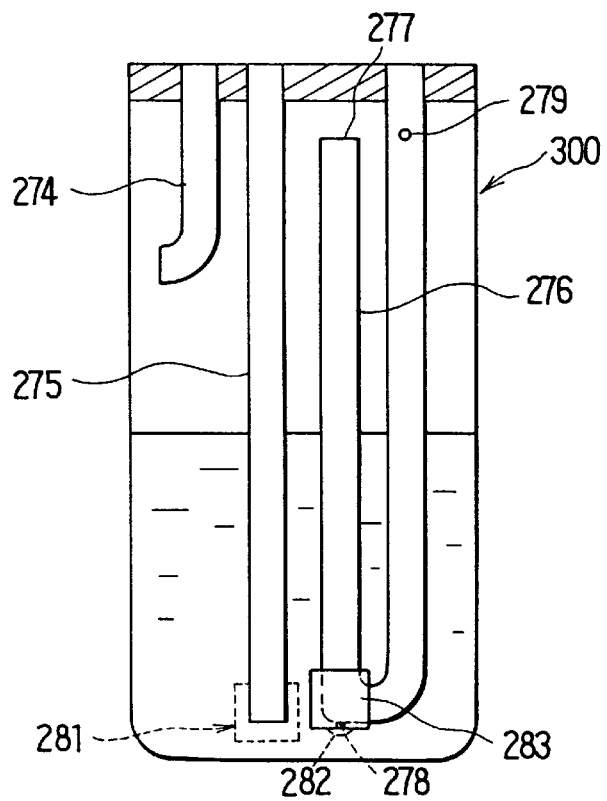
FIG. 3 is a schematic sectional view showing a gas-liquid separator according to a second preferred embodiment of the present invention.
Figure 4:
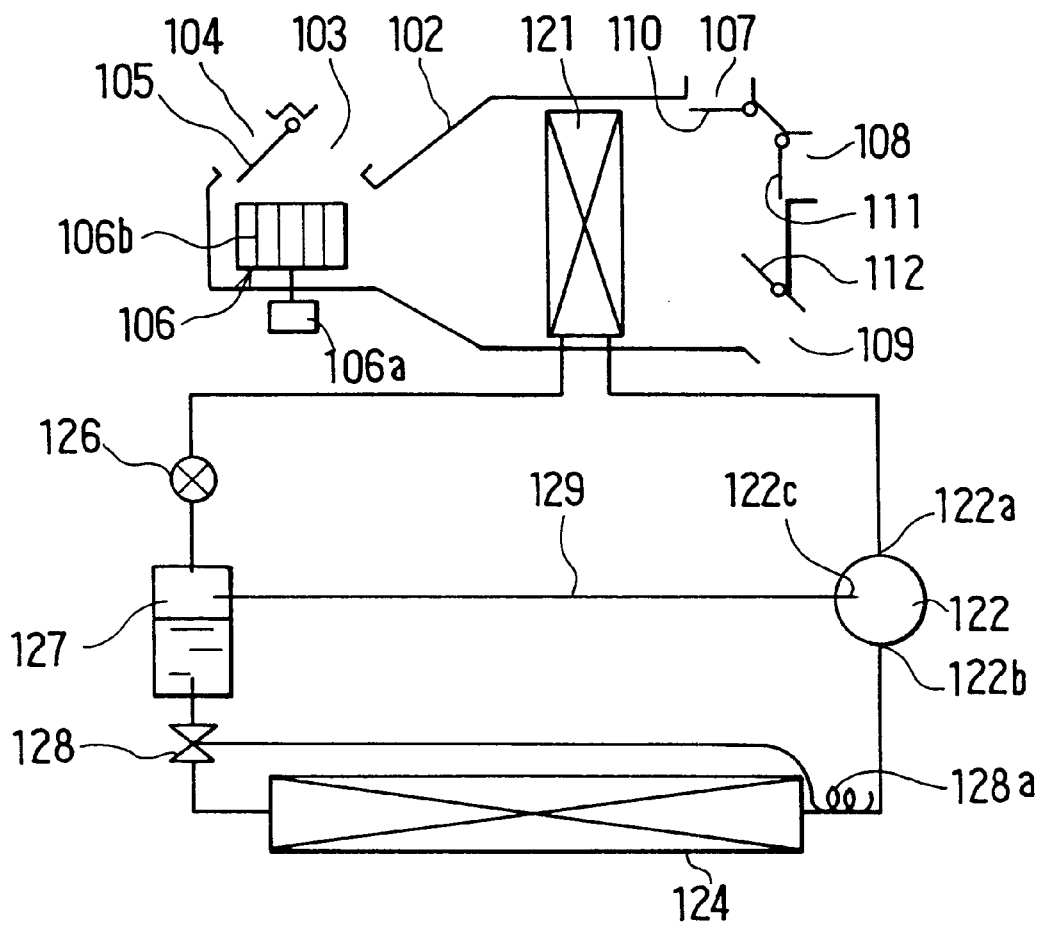
FIG. 4 is a schematic diagram showing a conventional air conditioning apparatus for a vehicle.

As shown in FIG. 3, in the second embodiment, a gas-liquid separator 300 has an inlet pipe 274, an outlet pipe 275 and a gas-suction pipe 276, similarly to those in the first embodiment. The gas-suction pipe 276 has a first suction hole 278 for sucking liquid refrigerant in the gas-liquid separator 300. In the second embodiment, a filter 281 is attached to an open end of the outlet pipe 275, and a filter 282 held by a block 283 is attached to the gas-suction pipe 276 to cover the first suction hole 278. Therefore, liquid refrigerant can be filtered before entering the outlet pipe 275 and the gas-suction pipe 276. This prevents dirt and dust contained in liquid refrigerant from being introduced into the outlet pipe 275 and the gas-suction pipe 276. This further prevents the first suction hole 278 from being blocked by dirt and dust contained in liquid refrigerant. The other portions in the second embodiment are similar to those in the first embodiment, and the explanation thereof is omitted.

Although the present invention has been fully described in connection with preferred embodiments thereof with reference to the accompanying drawings, it is to be noted that various [ch]anges and modifications will become apparent to those skilled in the art.

In the above-described embodiments, the opening area of the second suction hole 279 is larger than that of the open end 277, and the opening area of the open end 277 is larger than that of the first suction hole 278. However, when the opening area of the first suction hole 278 is made smaller, the opening area of the second suction hole 279 may be made smaller, because the opening area of the second suction hole 279 is determined according to the opening area of the first suction hole 278. In this case, the opening area of the open end 277 may be larger than that of the second suction hole 279, and the opening area of the second suction hole 279 may be larger than that of the first suction hole 278.

Such changes and modifications are to be understood as being within the scope of the present invention as defined by the appended claims.

What is claimed is:

1. A refrigerant cycle system for an air conditioning apparatus for a vehicle having a passenger compartment, said refrigerant cycle system comprising:

a first heat exchanger, disposed inside the passenger compartment, for performing heat-exchange between air to be blown into the passenger compartment and refrigerant flowing through the said first heat exchanger;

a second heat exchanger, disposed outside the passenger compartment, for performing heat-exchange between air outside the passenger compartment and refrigerant flowing through said second heat exchanger;

a compressor for compressing refrigerant, said compressor having an inlet port for introducing therein low-pressure refrigerant, a gas-injection port for introducing therein middle-pressure refrigerant and an outlet port for discharging compressed high-pressure refrigerant;

first decompressing means for reducing a pressure of liquid refrigerant, condensed in one of said first heat exchanger and said second heat exchanger, to a middle pressure;

a gas-liquid separator for separating the middle-pressure refrigerant decompressed by said first decompressing means into gas refrigerant and liquid refrigerant;

second decompressing means for decompressing the liquid refrigerant separated by said gas-liquid separator; and a gas-injection pipe for introducing gas refrigerant separated by said gas-liquid separator into said gas-injection port of said compressor, wherein:

said gas-liquid separator includes a gas-suction pipe for introducing gas refrigerant into said gas-injection pipe; and said gas-suction pipe includes
an open end opened in gas refrigerant within said gas-liquid separator,
a middle pipe portion which is immersed in liquid refrigerant within said gas-liquid separator and has a first suction hole through which liquid refrigerant is introduced, and
a second suction hole at a downstream refrigerant side of said first suction hole, provided in gas refrigerant within said gas-liquid separator.

2. The refrigerant cycle system according to claim 1, wherein said first suction hole has an opening area less than each opening area of said second suction hole and said open end of said gas-suction pipe.

3. The refrigerant cycle system according to claim 1, wherein:
said first suction hole has an opening area less than an opening area of said second suction hole; and
the opening area of said second suction hole is less than an opening area of said open end of said gas-suction pipe.

4. The refrigerant cycle system according to claim 1, wherein:
said first decompressing means is an electrical expansion valve for reducing the pressure of liquid refrigerant to the middle-pressure; and
said second decompressing means is a thermal expansion valve which adjusts a super-heating degree of refrigerant to be introduced into said inlet port of said compressor.

5. The refrigerant cycle system according to claim 1, further comprising:
a filter member, attached to said first suction hole of said gas-suction pipe, for filtering liquid refrigerant before being sucked into said gas-suction pipe, and a holing member, attached to said gas-suction pipe, for holding said filter member.

6. The refrigerant cycle system according to claim 1, wherein:
said gas-suction pipe is approximately a U-shaped pipe having first and second ends and a bottom;
said open end of said gas-suction pipe is formed at said first end of said U-shaped pipe;
said second end of said U-shaped pipe is connected to said gas-injection pipe; and
said first suction hole is formed in said bottom of said U-shaped pipe.

7. A gas-liquid separator for a refrigerant cycle having a compressor for compressing refrigerant, said gas-liquid separator, for separating gas-liquid refrigerant into gas refrigerant and liquid refrigerant, comprising:

a refrigerant case for receiving refrigerant therein;

an inlet pipe through which gas-liquid refrigerant in the refrigerant cycle is introduced into said refrigerant case;

an outlet pipe through which liquid refrigerant within said refrigerant case is supplied to the refrigerant cycle;

a gas-suction pipe through which gas refrigerant is introduced into the compressor at an intermediate-compression step; and said gas-suction pipe includes
an open end opened in gas refrigerant within said refrigerant case,
a middle pipe portion which is immersed in liquid refrigerant within said refrigerant case and has a first suction hole through which liquid refrigerant is introduced from said refrigerant case to the compressor, and
a second suction hole at a downstream refrigerant side of said first suction hole, provided in gas refrigerant within said refrigerant case.

8. The gas-liquid separator according to claim 7, wherein said first suction hole has an opening area less than each opening area of said second suction hole and said open end of said gas-suction pipe.

9. The gas-liquid separator according to claim 7, wherein:
said gas-suction pipe is approximately a U-shaped pipe having first and second ends and a bottom;
said open end of said gas-suction pipe is formed at said first end of said U-shaped pipe;
said second end of said U-shaped pipe is coupled to the compressor through a connection pipe; and
said first suction hole is formed in said bottom of said U-shaped pipe.

10. The gas-liquid separator according to claim 9, wherein said U-shaped pipe has a round cross-section.

11. The gas-liquid separator according to claim 7, further comprising:
a filter member, attached to said first suction hole of said gas-suction pipe, for filtering liquid refrigerant before being sucked into said gas-suction pipe; and
a holing member, attached to said gas-suction pipe, for holding said filter member.

* * * * *